United States Patent [19]

Steiger et al.

[11] 4,013,107

[45] Mar. 22, 1977

[54] SAW BLADE AND FRET-SAW COMBINATION AND METHOD FOR USE THEREOF

[75] Inventors: Ferdinand Steiger; Werner Wahlen, both of Bern, Switzerland

[73] Assignee: Mapatex Establishment, Vaduz, Liechtenstein

[22] Filed: Jan. 13, 1976

[21] Appl. No.: 648,634

Related U.S. Application Data

[63] Continuation-in-part of Ser. No. 511,771, Oct. 3, 1974, abandoned.

[30] Foreign Application Priority Data

Oct. 12, 1973 Switzerland .................. 14551/73

[52] U.S. Cl. .................. 144/35 R; 83/527; 83/848; 145/31 R
[51] Int. Cl.² .................................. B27B 33/02
[58] Field of Search ............... 29/26 A; 408/22, 30; 144/35 R; 83/527, 530, 761, 762, 781, 783, 784, 848, 835; 145/31 R, 31 A, 31 AC, 31 AB, 33 R

[56] References Cited

UNITED STATES PATENTS

| | | | |
|---|---|---|---|
| 336,739 | 2/1886 | Parker | 83/848 |
| 1,515,619 | 11/1924 | Runnels | 144/35 R |
| 1,855,311 | 4/1932 | Basner | 145/31 R |
| 2,116,123 | 5/1938 | Ocenasek | 83/530 X |
| 2,307,411 | 1/1943 | Leatherman | 145/31 R X |
| 3,152,625 | 10/1964 | Bohrer | 83/746 |
| 3,680,610 | 8/1972 | Lindgren | 83/835 |

*Primary Examiner*—Othell M. Simpson
*Assistant Examiner*—W. D. Bray

[57] ABSTRACT

A fret-saw blade in combination with a fret-saw for sawing out slits starting from small-diameter holes, the blade having two rectangular segments of varying width with each of these segments having teeth of the same depth and parallel toothed and untoothed sides, and a method for using said combination.

6 Claims, 7 Drawing Figures

SAW BLADE AND FRET-SAW COMBINATION AND METHOD FOR USE THEREOF

This invention relates to a saw blade in combination with a fret-sawing machine and is a continuation-in-part of U.S. Ser. No. 511,771 filed by the inventor on Oct. 3, 1974, now abandoned and claiming priority from Swiss patent application No. 14551/73 filed Oct. 12, 1973.

As is well known, so-called strip-steel dies are used for punching out cardboard articles such as cardboard carton blanks and the like. To produce these dies, slits into which the strip-steel punch knives are to be inserted are sawed out of plywood sheets on a fret-sawing machine. Hence the straightness of the punch lines is very largely dependent upon the straightness of the slits into which the punch knives are inserted; the accuracy of the measurements of the blanks punched out also depends upon the accuracy of the shape and mutual positioning of the slits. Great difficulties are encountered in attempting to saw the slits accurately with conventional fret-sawing machines and the conventional saw blades used in them, for the saw cuts must be made starting from bore-holes which should be no more than 3 to 3.5 mm. in diameter. Consequently, saw blades are used which are narrow enough over their entire length to be drawn through such a borehole before being clamped into the sawing machine. Such narrow saw blades lack inherent stability in use, i.e., they are not twist-resistant. Moreover, the untoothed rear portions of these saw blades are so narrow—about 1.8 mm. wide—that it is not possible to guide or support them in such a way as to counteract the tendency to twist. The result of all these factors in practice is that the greatest care and effort must be expended in guiding the sheet of plywood by hand so that the saw cut runs as accurately as possible along a straight-line pattern.

It is the object of this invention to provide a saw blade in combination with a fret-sawing machine which overcomes the aforementioned difficulties. To this end, the saw blade according to the present invention comprises two longitudinal sections of differing widths, each section extending to a respective end of the blade, the toothings of the two sections being of substantially the same depth. Each of these sections also features an untoothed side substantially parallel to the toothed side.

The main advantage of a saw blade designed in this manner when used in combination with the fret saw, is that the broader of the two longitudinal sections may now have an untoothed, flat rear portion of such sufficiently greater width that it may quite easily be guided in a matching slit of a stationary guide member. The narrow longitudinal section may, on the other hand, as has been customary until now with the conventional fret-saw blades, be passed through the small hole in the sheet of plywood; it is then used to saw a short initial length of the slit, just enough to allow room in the slit and possibly the bore-hole for the broader longitudinal section; thereafter, the remainder of the slit is sawed with the broader, guided section of the saw blade. Practical trials have shown that if this section of the saw blade is faultlessly guided during its use, it is then possible to hold the sheet of plywood tightly, e.g., by means of suction, to a support guided for rectilinear movement, to move it together with this support, and thus to obtain a perfectly straight saw cut.

A subsidiary advantage of this combination is that, when the broader section of the blade is employed for cutting and the guide is engaged, the reciprocal blade speed can be substantially increased and the length of time in the actual sawing proportionally decreased.

The invention will now be described in detail with reference to the accompanying drawing, in which.

The two saw blades illustrated, designated as 1 and 2, respectively, are intended to be used in fret-sawing machines. Each of them has two longitudinal sections 1a, 1b and 2a, 2b, respectively, extending to the respective ends of the blades. These sections are substantially equal in length but are of different widths. They are provided with teeth having a substantially equal depth $t$ of about 1.5 mm. The overall width $b$ of the narrower sections 1b and 2b is about 3 mm. in each embodiment, which corresponds to the uniform width of the conventional fret-saw blades; the overall width $B$ of the broader sections 1a and 2a is about 6 to 7 mm. in each embodiment. Hence the width $c = B-t$ of the flat, untoothed rear portions of the sections 1a and 2a is approximately between 4.5 and 5.5 mm.

Figure 1:
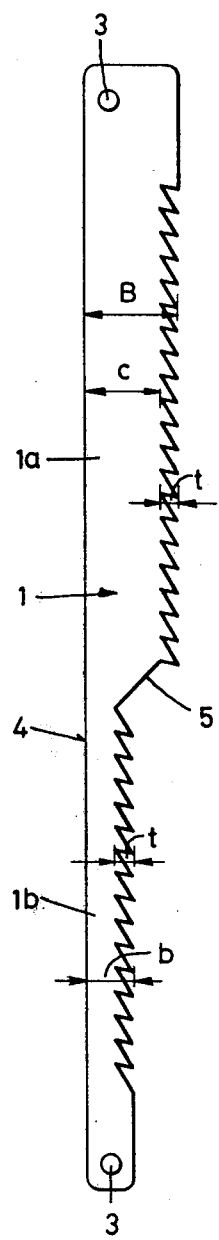
FIGS. 1 and 2 are elevations of different embodiments of the blade of this invention, (The proportions of length to width shown in these Figures need not necessarily correspond to the actual proportions.)
Figure 2:
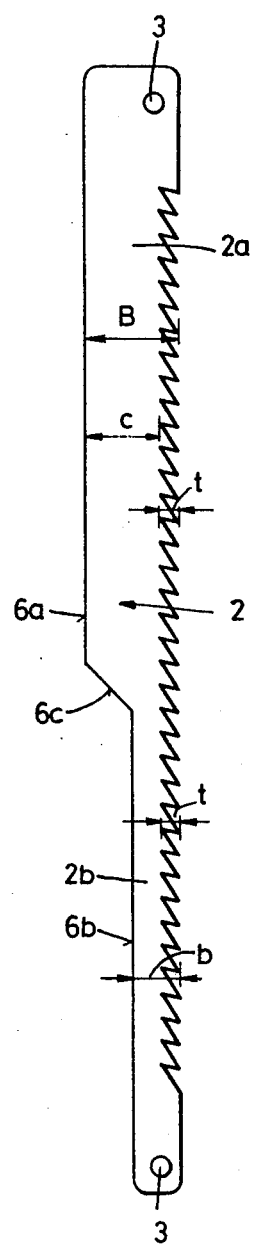

It will, of course, be apparent to those with skill in the art that the transitional segments 5 and 6c as represented in FIGS. 1 and 2 may be toothed or untoothed since they perform no readily discernible function in the sawing action itself.

In both embodiments, pins 3 project from a side of the saw blade at each end, as in conventional fret-saw blades, serving to clamp the blade in the sawing machine in a known manner. Other attachment means might obviously be provided instead of these pins.

The saw blade 1 has a straight rear edge 4. In view of the differing widths $B$ and $b$ of the sections 1a and 1b, respectively, this necessitates a step-like transition between the toothings of these sections, which may be carried out somewhat as shown at 5.

The toothing of the saw blade 2 runs in a straight line. In view of the differing widths $B$ and $b$ of the sections 2a and 2b, respectively, this necessitates the provision of a transitional rear edge section 6c between the rear edge 6a of the section 2a and the rear edge 6b of the section 2b. This section 6c may run somewhat as illustrated in the drawing.

It would in principle also be conceivable to provide a variation of the embodiment of FIG. 1 in which the toothing on the upper, broader section 1a of the saw blade might be disposed on the left-hand side instead of on the right-hand side. This would naturally mean that when in use, after the initial length of the slit has been sawn, the saw blade would have to be turned by 180° about its longitudinal axis before the remainder of the slit could be sawn with the broader upper section of the blade.

Figure 3:
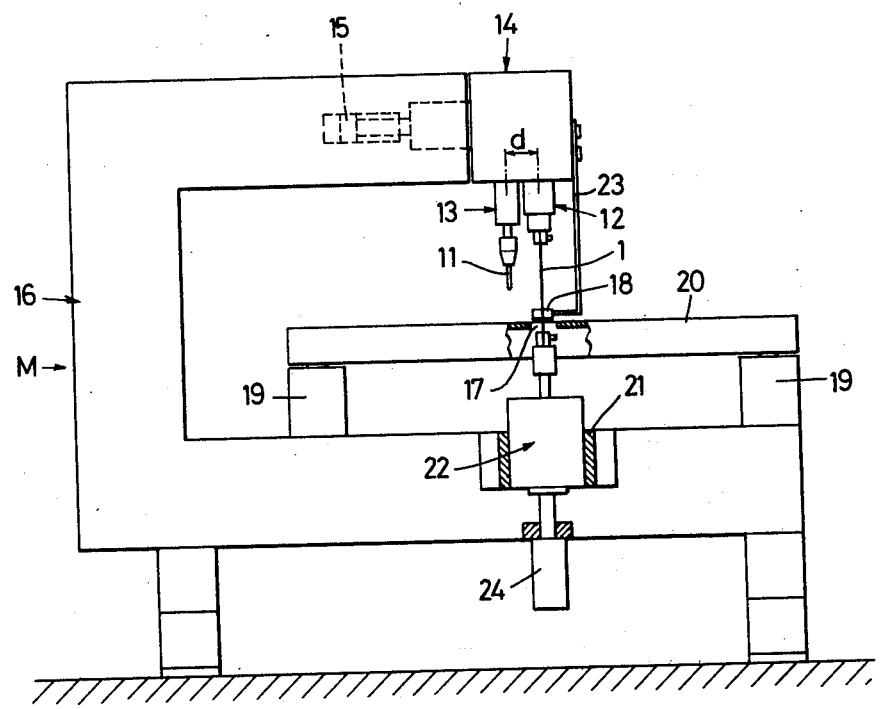
FIG. 3 is a front view of a fret saw useful in the combination of this invention.

FIG. 3 is a representative of the combination of this invention in which the saw blade 1 is attached to saw chuck 12. The saw chuck 12 is mounted parallel to drill chuck 13 from which drill bit 11 depends, on a common support 14. The common support 14 is movably attached to the frame 16 of the fret saw M, e.g., by piston 15, so that the support may be shifted laterally by a distance $d$ equal to the space between saw blade 1 and drill bit 11. The workpiece (not shown) rests upon platen 20 which, in turn, rests upon support 19 which is affixed to frame 16. The workpiece is moved forwardly or rearwardly as necessary either manually or by means of a movable platen featuring suitable attachment means, e.g., vacuum means.

Figure 4:
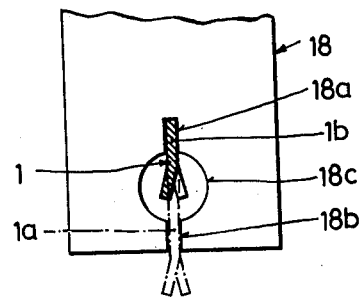
FIG. 4 is a partial top view of the blade guide utilized with this invention.

A guide blade member 18 is attached to the support 14 by suitable means such as a guide attachment brade 23. The forward end of the guide 18 has, when viewed from above, the configuration shown in FIG. 4; there are, namely two vertical slits 18$a$ and 18$b$ aligned with each other; between these two slits there is a widening 18$c$.

The saw, as depicted in FIG. 3, is in the sawing position with the narrow part of the blade 1. When in this position, the narrow part 1$b$ of the saw blade has its flat portion guided in the slit 18$a$ and its toothing located in the widening 18$c$. When later on, as described below, the wider portion 1$a$ of the saw blade is in the sawing position, this wider part occupies, with regard to the guide 18, the position shown in dot-dash lines in FIG. 4; the flat portion of this wider part 1$a$ is then guided in both slits 18$a$ and 18$b$, and the toothing of that wider part 1$a$ is located immediately in front of the guide member 18.

The saw blade 1 extends through the opening 17 in the platen 20 and is engaged at its lower end by reciprocating motor means 22, mounted in a bearing 21 attached to the frame 16. The saw chuck 12 contains upward biasing means such as a coil spring. Conventional means for reciprocating movement can be used to provide the necessary motion to the blade and these means do not form a part of this invention. It would even be possible to provide the chuck with reciprocating means and downward bias the bottom blade attachment means. Hydraulic cylinder 24 is provided to move the blade 1 and motor driven reciprocating motion means 22 upward or downward so that either the wide portion or the narrow portion of the blade is utilized exclusively for the sawing operation at a particular time.

Figure 5:
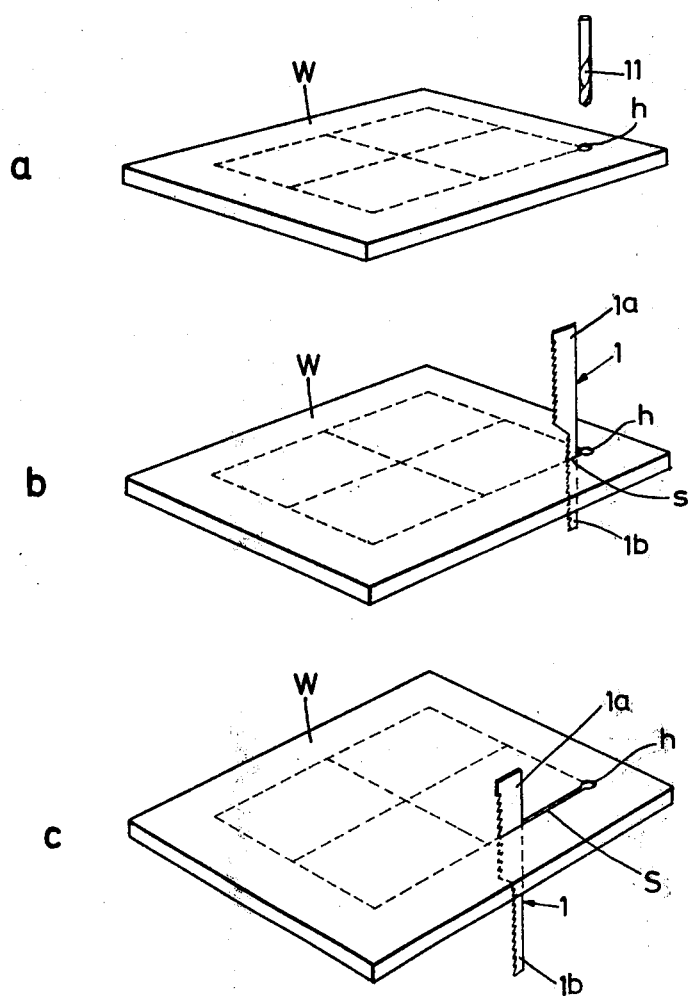
FIGS. 5a, b and c are perspective views which illustrate the method of this invention.

The method of this invention will now be explained with reference to FIGS. 3 and 5 $a$, $b$ and $c$. Initially the drill chuck 13 is lowered and a hole $h$ drilled in the workpiece $W$ by drill bit 11, as shown in FIG. 5 $a$. The hole $h$ is of a sufficient diameter to admit the narrow portion 1$b$ of the saw blade 1 as shown in FIG. 5 $b$. The drill bit 11 is then withdrawn from the hole and the saw blade 1 is moved into position over the hole, inserted through it and the platen opening 17 and clamped at the bottom. The motor 22 is then activated and the narrow portion 1$b$ of the saw blade 1 supported by the guide member 18, cuts a slit $s$ by conventional reciprocating sawing action of a width sufficient to admit the wider portion 1$a$ of the blade by moving the workpiece against the blade. Afer this cut has been made the workpiece $W$ is moved back to its initial position and the blade is lowered. e.g., by hydraulic piston 24, and the remaining portion of the cuts is made solely by the wider portion 1$a$ of the blade as depicted in FIG. 5 $c$. The added width of the wider portion of the blade supportively positions it against the guide member 18 thereby helping to counteract the twisting forces discussed previously.

The saw M can also cut faster than the conventional saw with this blade because, when the wider blade portion and guide member combination is utilized, the cutting speed may be substantially increased without snapping the blade. This speed increase for the second portion of the cutting is a particularly advantageous embodiment of the method of this invention.

Having fully and completely disclosed our invention, we hereby claim:

1. A saw blade in combination with a fret-saw; said fret-saw having means for clamping said blade substantially at its ends, said saw blade consisting essentially of two connected longitudinal sections having parallel sides of differing widths with each of said sections being toothed at the same one of said sides, the toothings for each of said sections being of substantially the same depths, the fret-saw further including means for selecting the cutting portion of said blade so that only one of said sections is cutting at any particular moment.

2. The combination of claim 1 in which said saw includes guide means for engaging said wider section of said blade when said blade is in cutting position.

3. The combination of claim 1 in which the saw includes a variable speed for cutting.

4. A method for cutting a substantially flat workpiece in a precise pattern including
 a. drilling a hole of sufficient size to allow a saw blade of narrow width pass unrestrictedly through the hole;
 b. inserting a saw blade, consisting essentially of two longitudinal substantial sections of differing width, each of said sections having two parallel sides, with one of said sides of each of said sections being toothed and the toothings being of substantially the same depth, into said hole, said hole being of sufficient diameter to fully admit only the narrower blade section;
 c. initiating sawing with the narrower blade section until a cut is made of sufficient length to admit the wider section; and
 d. completing the cutting with said wider section.

5. The method of claim 4 in which a guide member is positioned for supporting the wider section of said blade immediately prior to cutting with said wider portion.

6. The method of claim 4 which the rate of is accelerated when cutting is begun with said wider section.

* * * * *